Figure 1:
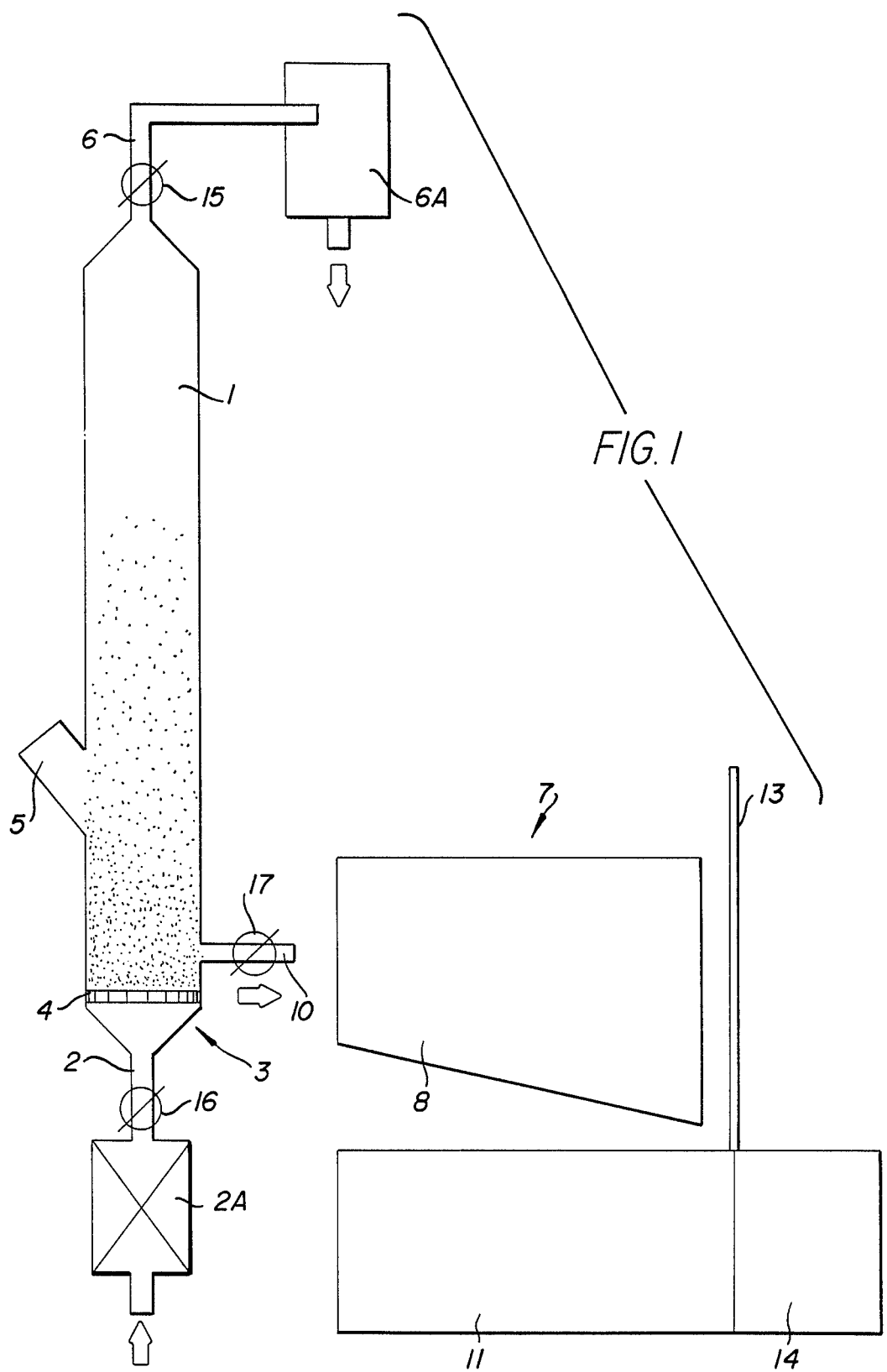

United States Patent [19]

Stone et al.

[11] Patent Number: 4,746,073
[45] Date of Patent: May 24, 1988

[54] RECOVERY OF ALEURONE CELLS FROM WHEAT BRAN

[75] Inventors: Bruce A. Stone; James Minifie, both of Melbourne, Australia

[73] Assignee: La Trobe University, Victoria, Australia

[21] Appl. No.: 59,238

[22] Filed: Jun. 10, 1987

Related U.S. Application Data

[63] Continuation of Ser. No. 815,096, filed as PCT AU85/00066, Mar. 29, 1985, published as WO85/04349 on Oct. 10, 1985, abandoned.

[30] Foreign Application Priority Data

Apr. 2, 1984 [AU] Australia ............................ PG4377

[51] Int. Cl.⁴ .............................................. B02C 9/04
[52] U.S. Cl. .................................. 241/24; 209/2; 209/12; 209/127.1; 241/79.1
[58] Field of Search .................. 209/2, 3, 4, 12, 19, 209/20, 21, 30, 36, 37, 127.1, 128, 130, 138, 139.1, 638, 642; 241/185 R, 7; 406/173

[56] References Cited

U.S. PATENT DOCUMENTS

| | | | |
|---|---|---|---|
| 2,135,716 | 11/1938 | Johnson | 209/2 |
| 2,561,396 | 7/1951 | Matheson | 209/138 X |
| 2,683,685 | 7/1954 | Matheson | 209/138 X |
| 2,848,108 | 8/1958 | Brastad | 209/127 |
| 3,059,772 | 10/1962 | Le Baron | 209/127.1 |
| 3,291,302 | 12/1966 | Brastad | 209/129 X |
| 3,308,944 | 3/1967 | Chamberlain et al. | 209/3 |
| 3,493,109 | 2/1970 | Carta et al. | 209/127.1 X |
| 4,208,260 | 6/1980 | Oughton | 204/180 R |
| 4,226,703 | 10/1980 | Stout | 209/127 B |
| 4,279,740 | 7/1981 | Isogaya | 209/12 |

FOREIGN PATENT DOCUMENTS

| | | |
|---|---|---|
| 113030 | 5/1941 | Australia . |
| 164407 | 8/1953 | Australia . |
| 4226578 | 6/1979 | Australia . |
| 558737 | 3/1957 | Italy ............................ 209/12 |
| 706705 | 4/1954 | United Kingdom . |
| 1043245 | 9/1966 | United Kingdom . |

Primary Examiner—Andres Kashnikow
Assistant Examiner—C. Trainor
Attorney, Agent, or Firm—Armstrong, Nikaido, Marmelstein & Kubovcik

[57] ABSTRACT

A method and apparatus for physical separation of aleurone cell particles and pericarp-testa particles from commercial wheat bran, the method comprises removing from a fraction of aleurone cell particles and pericarp-testa articles within the sieve mesh range of larger than about 130 μm and smaller than about 290 μm, obtained from commerical wheat bran by subjecting the bran to hammer-milling whereby the bran is broken and reduced into particles which consist predominantly of pericarp-testa particles and aleurone cell particles and then sized to the sieve mesh range, a fraction of particles which are smaller than about 40 μm and electrostatically charging the remaining aleurone cell particles and pericarp-testa particles. Passing electrostatically charged remaining aleurone cell particles and pericarp-testa particles through an electrical field generated by an electrostatic separator, whereby the remaining aleurone cell particles and pericarp-testa particles are fractionated by the differential of their electrical charges. Removal of the fraction of particles which are smaller than about 40 μm and the electrostatic charging of the remaining aleurone cell particles and pericarp-testa particles is preferably effected by air elutriation of the mixture of the particles and which indues trioelectrification of the particles. Apparatus comprising an air elutriator with associated electrostatic separator.

4 Claims, 2 Drawing Sheets

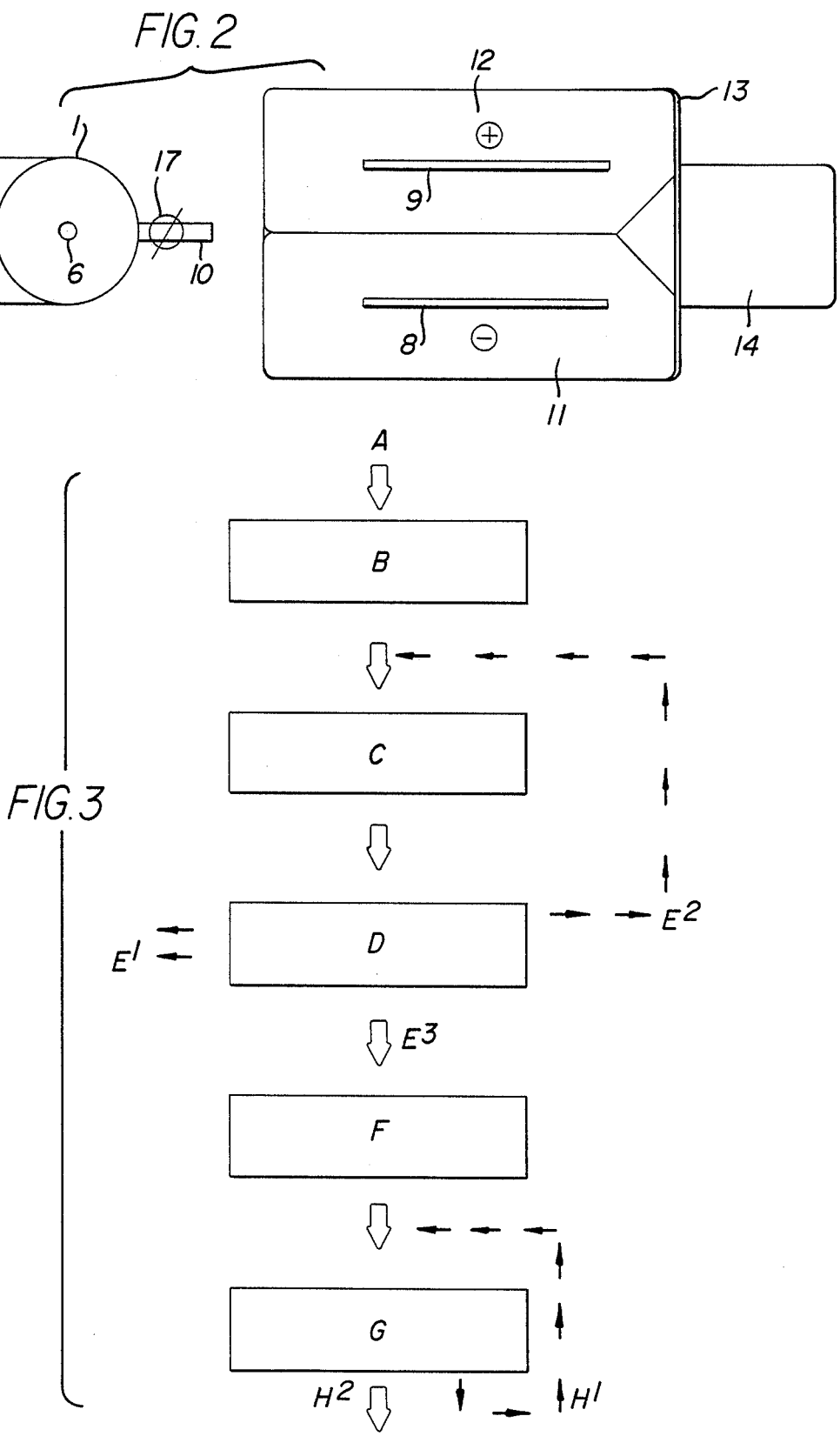

RECOVERY OF ALEURONE CELLS FROM WHEAT BRAN

This application is a continuation of application Ser. No. 815,096 filed as PCT AU85/00066 on Mar. 29, 1985, published as WO85/04349 on Oct. 10, 1985, now abandoned.

BACKGROUND OF THE INVENTION

This invention relates to a method and apparatus for the physical separation and recovery of a highly enriched fraction of aleurone cell particles from commercial wheat bran, in which a fraction of aleurone cell particles and pericarp-testa particles obtained by hammer-milling of wheat bran is subjected to size-clasification/particle electrification/particle electrostatic fractionation treatments, whereby highly purified aleurone cell particles are obtained.

Wheat bran is the outer layer of the wheat caryopsis and is itself composed of layers of different cell types. The outer layers of the bran arise from the parent plant and are the seed-coat or pericarp-testa. The inner layer is the aleurone, which is the outer-most layer of the endosperm. The aleurone cells, which comprises more than half the weight of wheat bran, are thick-walled and enclose the cell contents, which are rich in protein of high nutritional value and B-vitamins.

Aleurone cells are important constituents in animal feed-stuffs and a source of dietary fibre in human nutrition. Aleurone particles thus constitute a potentially useful commodity as a relatively cheap source of "dietary fibre" and are of a particular commercial interest on that account due to the current emphasis on "dietary fibre" in nutrition.

Methods for the preparation of large amounts of aleurone particles are therefore of actual or potential commercial significance in the food industry, however; known methods lack efficiency.

In the conventional roller milling of whole wheat grain, the bran (pericarp-testa and aleurone) together with some adhering starchy endosperm is collected in the bran and pollard streams. Separation and recovery of aleurone particles from the bran by known methods has been unsatisfactory.

A method for the fractionation of aleurone cell particles from pericarp-testa, devised by Steven D. J., is published in *J. Sci. Food Agric.* (1973) 24, 307–317. This procedure is based on a density gradient separation in benzene-carbon tetrachloride and is limited by the capacity of the gradient and the availability of high capacity centrifuges. Its success is highly temperature dependent.

SUMMARY OF THE INVENTION

We have now evolved a method for the physical separation of aleurone cell particles and pericarp-testa particles from commercial wheat bran, which method comprises removing from a fraction of aleurone cell particles and pericarp-testa particles within the sieve mesh range of larger than about 130 $\mu$m and smaller than about 290 $\mu$m, obtained from commerical wheat bran by subjecting the bran to hammer-milling whereby the bran is broken and reduced into particles which consist predominantly of pericarp-testa particles and aleurone cell particles and then sized to said sieve mesh range, a fraction of particles which are smaller than about 40 $\mu$m and electrostatically charging the remaining aleurone cell particles and pericarp-testa particles, then passing said electrostatically charged remaining aleurone particles and pericarp-testa particles through an electrical field generated by an electrostatic separator, whereby said remaining aleurone cell particles and pericarp-testa particles are fractionated by the differential of their electrical charges.

More particularly, in accordance with the invention a highly enriched fraction of aleurone cell particles is obtained from commerical wheat bran by the method which comprises:

(A) sizing the aleurone cell particles and the pericarp-testa particles separated from wheat bran by milling in which the wheat bran is broken and reduced into particles that consist predominantly of pericarp-testa particles and aleurone cell particles, so as to obtain a sized fraction of both said particles within the sieve mesh range of larger than about 130 $\mu$m and smaller than about 290 $\mu$m;

(B) size-classifying said fraction of particles within the sieve mesh range of larger than about 130 $\mu$m and smaller than about 290 $\mu$m so as to remove those particles which are smaller than about 40 $\mu$m and electrostatically charging the remaining aleurone cell particles and pericarp-testa particles differentially by triboelectrification; and (C) electrostatically separating the size-classified aleurone cell particles from remaining pericarp-testa particles by passing said electrostatically charged remaining aleurone particles and pericarp-testa particles through an electrical field generated by an electrostatic separator whereby the respective particles are fractionated by the differential of their electrical charges.

We have found that for the successful separation of the aleurone cell particles from pericarp-testa particles, whereby a highly enriched fraction of aleurone cell particles can be recovered in good yield, it is necessary to size-classify the particles to the relatively narrow range specified, then remove those particles which are smaller than about 40 $\mu$m. Although the precise sieve size within the specified range size is apparently not critical to the particle electrification or the subsequent electrostatic separation, so that a 225–300 $\mu$m cut separated as well as a 135–225 $\mu$m cut, a critical aspect is the elimination of the very small particles of <40 $\mu$m. In practice, this is conveniently and preferably achieved by air elutriation, which at the same time leads to triboelectrification of the particles for electrostatic separation, as set out below.

Electrostatic separation of the electrostatically charged remaining aleurone cell particles from electrostatically charged pericarp-testa particles,relies upon the different dielectric constants of those particles. Although electrostatic charging of the remaining aleurone particles and pericarp-testa particles may possibly be effected by conductive induction or by ion bombardment (corona discharge), we have found that it is much more convenient to effect the electrostatic charging of said particles by triboelectrification, which can be conveniently induced by air elutriation of said particles.

PREFERRED EMBODIMENT OF THE INVENTION

Thus, according to a preferred embodiment of the invention, said method involves subjecting the commercial wheat bran to milling/air elutriatio/electrostatic fractionation treatments, by the combination of steps which comprise:

(I) separating aleurone cell particles from pericarp-testa particles by hammer-milling of commercial wheat bran whereby the bran is broken and reduced into particles which consist predominantly of pericarp-testa particles and aleurone cell particles; and (II) fractionating the aleurone cell particles from the pericarp-tests particles by:

(i) sizing of the hammer-milled bran so as to obtain a fraction of particles within the sieve mesh range of larger than about 130 μm and smaller than about 290 μm, (ii) size-classifying said fraction of particles within the sieve mesh range of larger than about 130 μm and smaller than about 290 μm so as to remove those particles which are smaller than about 40 μm and electrostatically charge the remaining aleurone cell particles and pericarp-testa particles differentially by triboelectrification, by means of substantially dry air stream elutriation of said particles within the sieve mesh range of about 130 μm and 290 μm size sieve in an elutriator column so as to remove those particles which are smaller than about 40 μm and electrostatically charge the remaining aleurone cell particles and pericarp-testa particles differentially by rubbing against one another and/or against the elutriator column side wall, and (iii) electrostatically separating the size-classified remaining aleurone cell particles from pericarp-testa particles by passing an air stream entraining said electrostatically charged remaining aleurone cell particles and pericarpt-testa particles through an electric field generated by an electrostatic separator whereby said particles in the air stream are fractionated by the differential of their electric charges and deflected into separate receiver bins.

Air elutriator and electrostatic separator apparatus suitable for use in carrying out the method of the invention for the production of a highly enriched fraction of aleurone cell particles from a size-classified product mixture predominantly of pericarp-testa particles and aleurone cell obtained from commercial wheat bran by milling in which the wheat bran has been broken and reduced into aleurone cell particles and pericarp-testa particles then size-classified to be within the sieve mesh range of larger than about 130 μm and smaller than about 290 μm, said apparatus being adapted to remove those particles which are smaller than about 40 μm from said product mixture and electrostatically charge the aleurone cell particles and pericarp-testa particles for electrostatic fractionation, comprises:

an elutriator column adapted for effecting air elutriation of said size-classified product mixture of aleurone cell particles and pericarp-testa particles in said column;

air inlet means disposed at or near the base of the elutriator column and adapted for introducing a stream of filtered dry compressed air into the elutriator column to entrain said size-classified product mixture of aleurone cell particles and pericarp-testa particles;

a porous diaphragm disposed near the base of the elutriator column for dispersing the stream of filtered dry compressed air delivered to the base of said column to effect entrainment of said size-classified product mixture of aleurone cell particles and pericarp-testa particles;

a closable inlet chute in the elutriator column side wall and disposed above the porous diaphragm for feeding said size-classified mixture of aleurone cell particles and pericarp-testa particles into the elutriator column for air elutriation to remove those particles which are smalller than about 40 μm and electrostatically charge the remaining aleurone cell particles and pericarp-testa particles by rubbing against each other and/or the elutriator column side wall;

a closable exhaust air vent at or near the top of the elutriator column for exit of exhaust air carrying those particles which are smaller than about 40 μm entrained therewith for the removal from the elutriator column of said particles smaller than about 40 μm;

an electrostatic separator disposed relatively adjacent the elutriator column side wall and with spaced-apart negative and positive electrode plates for deflecting electrostatically charged aleurone cell particles and remaining pericarp-testa particles entrained in a stream of air directed from the elutriator column into the space between said electrodes;

a product mixture outlet nozzle disposed in the elutriator column side wall and located above the porous diaphragm for directing a fine stream of air with entrained electrostatically charged aleurone cell particles and remaining pericarp-testa particles to between the negative and positive electrode plates of the electrostatic separator for electrostatic deflection;

an aleurone cell particles fraction bin and a pericarp-testa particles fraction bin disposed beneath the negative and positive electrode plates of the electrostatic separator for receiving said deflected particles, respectively; and compressed air pump means with associated air flow control means adapted to deliver a stream of filtered dry compressed air to the elutriator column for elutriation of said product mixture and to deliver a fine stream of air to the product mixture outlet means for directing entrained electrostatically charged remaining aleurone cell particles and pericarp-testa particles between the negative and positive electrode plates of the electrostatic separator for electrostatic deflection by the differential of the electrical charges of said particles.

In the practical design and operation of said apparatus, care should be taken to observe factors which may affect the efficiency of the aleurone cell particles and the pericarp-testa particles separation, including:

(a) effect of the moisture content of the particles on the triboelectrification and dielectric differential, especially with respect to the effect of changes in ambient relative humidity;

(b) residence time in the elutriator column for satisfactory triboelectrification of the particles;

(c) effect of the elutriator column design and the material of its construction on the triboelectrification of the particles; and (d) electrostatic separator configuration and operating conditions with respect to effect of charge density on the plates, plate separation, particle stream velocity on particle resolution in the electrostatic separator, in which the aleurone particles are deflected toward the negative electrode and thus have a higher dielectric constant than the pericarp-testa particles.

In a preferred embodiment of said apparatus, a particles baffle plate may be disposed from the downstream end of the electrostatic separator electrodes for restaining the flow of any non-deflected particles to a particles recycle bin for return of any such particles to the elutriator column; and a cyclone separator may be disposed in the exhaust air vent downstream of the air vent closing means for collection of those particles which are smaller than about 40 μm removed fromt he elutriator column by entrainment in the exhaust air.

Production scale apparatus suitable for carrying out the method of the invention can be interfaced by cereal processor or millers or the like, with various types of mills including conventional flour mills, for example as an alternative to sieving for resolution or partial resolution of some mill streams components. Other applications of the method and apparatus of the invention in the cereal food industry include the preparation of aleurone and non-aleurone enriched fractions for use in speciality goods, e.g. biscuits, health foods or as additives to non-cereal foods; the enrichment of flour with aleurone to increase protein, vitamin and mineral content (bread baked with aleurone at 1% of flour has been found to be satisfactory) at the same time increasing the flour extraction rate; as a means of separating nutritious from non-nutritious parts of cereals other than wheat, e.g. sorghum, maize, rice; and the resolution of mixtures of particles of non-cereal vegetable origin.

PRACTICAL EMBODIMENT OF THE INVENTION

The method and apparatus of the present invention will be further described with reference to the accompanying drawings, which form part of this specification, and in which:

FIG. 1 is a front elevational diagrammatic representation of an elutriator column and electrostatic separator through which the preliminary sieve sized fraction of hammer-milled bran particles is passed according to said method for removal of those particles which are smaller than about 40 $\mu$m, then electrostatic separation of the electrostatically charged remaining aleurone cell particles and the pericarp-testa particles by passing between the electrode plates of the electrostatic separator to effect separation of those particles by their electrical charge differential according to the method of the invention;

FIG. 2 is a plan view diagrammatic representation of the elutriator column and electrostatic separator shown in FIG. 1; and FIG. 3 is a flow-sheet diagrammatic representation of the preferred embodiment of said method, in which a source of whole wheat grain in converted to commercial flour, the bran then being hammer-milled for breaking and reducing into a product mixture of pericarp-testa particles and aleurone cell particles, which misture of particles is then subjected to air elutriation and electrostatic separation in accordance with the preferred embodiment of the invention.

Discussing the preferred embodiment of the method of the invention in more detail with reference to the accompanying drawings, in the flow-sheet diagram of FIG. 3: A represent a source of whole wheat grain; B represents commercial flour produced from the whole wheat grain; C represents a hammer-mill grinder having a tip speed of about 90 m/sec (15–20,000 feed/minute) into which the commercial flour is fed for hammer-milling to break and reduce the bran into particles which consist predominantly of pericarp-testa particles and aleurone cell particles; D represents a multiscreen sifter into which the pericarp-testa and aleurone cell particles are fed for preliminary sizing within the mesh range of larger than about 130 $\mu$m mesh and smaller than about 290 $\mu$m mesh; E' represents a flow outlet from the multiscreen sifter for discard-particles which are smaller than about 130 $\mu$m mesh, $E^2$ represents a flow outlet from the multiscreen sifter for recycle particles which are larger than about 290 $\mu$m mesh and are returned to the hammer-miller grinder for further grinding, and $E^3$ represents a flow outlet from the multiscreen sifter for elutriator-particles which are within the mesh range of larger than about 130 $\mu$m mesh and smaller than about 290 $\mu$m mesh and are fed into an air elutriator; F represents the air elutriator into which said elutriator-particles within the specified mesh range for the pericarp-testa particles and aleurone cell particles are fed for air elutriation in a stream of dry air and in the course of which said particles become differentially charged electrostatically as indicated; G represents an electrostatic separator to which the air elutriated-particles are fed for fractionation by electrostatic deflection whereby the respective particles are separated and directed into separate receiver bins for recovery of the aleurone cell particles; H' represents recycled non-deflected/non-separated pericarp-testa particles and aleurone cell particles for return to the electrostatic separator; and $H^2$ represents deflected/separated aleurone cell particles recovered by the method of the invention.

The hammer-milling of the wheat bran for mechanical separation of the aleurone cell particles from the pericarp-testa, can be high speed hammer-milling with a tip speed in the range of 15,000–20,000 ft/min. as described by Stevens, D. J., supra, or as described by Bacic, A. and Stone B. A., (1981), *Aust. J. Plant Physiol.* 8, 483–474, whereby the bran layer is broken into particles which consist predominantly either of pericarp-testa or aleurone cells.

Preliminary sieve sizing of the hammer-milled bran in step (II)(i) of said method, in which the hammer-milled bran is sized to a narrow range, normally about 130 $\mu$m to about 290 $\mu$m, more preferably larger than about 135 $\mu$m and smaller than about 225 $\mu$m mesh (nylon) sieves, is important for the success of the subsequent fractionation step (II)(ii) of said method, in effecting fractionation of the aleurone cell particles from the pericarp-testa particles.

The preliminary sieve sizing of the hammer-milled bran can be effected by a multiscreen sifter, the hammer-milled bran being sifted into: (a) a hammer-mill recycle fraction larger than about 290 $\mu$m mesh size; (b) a processing fraction preferably between about 250 $\mu$m mesh size and about 135 $\mu$m mesh size; and (c) a discard fraction smaller than about 130 $\mu$m mesh size. The size-classified particles product mixture, which is preferably between about 225 $\mu$m mesh size and about 135 $\mu$m mesh size, is subjected to air elutriation and electrostatic separation according to the preferred form of the method of the invention.

Referring to FIGS. 1 and 2 of the drawings, the air elutriator column 1 for effecting air elutriation of the size-classified particles product mixture, which has the two-fold purpose of removing said very fine and light particles and at the same time electrostatically charging the remaining aleurone cell particles and pericarp-testa particles through rubbing against one another and with the walls of the elutriator column 1, is provided with air inlet means 2 disposed in the base 3 of the elutriator column 1 for introducing a stream of filtered dry compressied air from air compressor pump 2A into the elutriator column 1 to entrain said size-classified product mixture of aleurone cell particles and pericarp-testa particles.

A porous diaphragm 4 is disposed near the base 3 of the elutriator column 1 for dispersing the stream of filtered dry compressed air delivered to the base 3 of said elutriator column 1 to effect entrainment of said size-classified product mixture of aleurone cell particles and pericarp-testa particles; a closable inlet chute 5 is disposed in the side wall of the elutriator column 1 above the porous diaphragm 4 for feeding said size-classified mixture of aleurone cell particles and pericarp-testa particles into the elutraitor column 1; and a closable exhaust air vent 6 is disposed at or near the top of the elutriator column 1 for exit of exhaust air carrying pericarp-testa particles smaller than about 40 μm entrained therewith for the removal of those particles from the elutriator column 1.

An electrostatic separator 7 is disposed relatively adjacent the side wall of the elutriator column 1, with spaced-apart negative and positive electrode plates 8 and 9 for deflecting electrostatically charged remaining aleurone cell particles and pericarp-testa particles entrained in a stream of air directed from the elutriator column into the space between said electrodes 8 and 9. Said stream of air with entrained particles is directed between said electrodes 8 and 9 by means of a product mixture outlet nozzle 10 located above the porous diaphragm 4 and extending outwardly from the sidewall of the elutriator column 1 in the direction of said electrodes 8 and 9.

An aleurone cell particles fraction bin 11 and a pericarp-testa particles fraction bin 12 are disposed beneath the negative and positive electrode plates of the electrostatic separator for receiving said deflected particles, respectively. Preferably, a particles baffle plate 13 is disposed from the downstream end of the electrostatic separator electrodes for restraining the flow of any non-deflected particles to a particles recycle bin 14 for return of any such particles to the elutriator column, and preferably a cyclone separator 6A is disposed in the exhaust air vent 6 downstream of said exhaust air vent control valve for collection of those particles which are smaller than about 40 μm removed from the elutriator column by entrainment in the exhaust air.

Air flow control valve 16 disposed in air inlet means 2 is associated with compressed air pump means (not shown) to deliver/control the air stream rate of filtered dry compressed air to the elutriator column for elutriation of said product mixture and to deliver/control the stream of compressed air to the product mixture outlet nozzle 10 for directing entrained electrostatically charged remaining aleurone cell particles and pericarp-testa particles, between the negative and positive electrode plates 8 and 9 of the electrostatic separator 7 for electrostatic deflection. Air flow control valve 17 disposed in product mixture outlet nozzle 10 controls the air stream rate to the negative and positive electrodes plates 8 and 9 of the electrostatic separator 7.

In operation, a processing amount of the sized-fraction of aleurone cell particles and pericarp-testa particles within the sieve range of larger than about 130 μm and smaller than about 290 μm is fed into the elutriator column 1 via the chute 5, which is then closed and the compressed air pump means is energised to deliver a stream of filtered dry compressed air into the elutriator column 2, the air control valves 15/16 being open and the air control valve 17 being closed. When those particles which are smaller than about 40 μm in said processing amount of aleurone cell particles and pericarp-testa particles have been removed from the elutriator column 1 via the exhaust air vent 6, the air control valve 15 is closed and the air control valve 17 is opened whereby the remaining aleurone cell particles and pericarp-testa particles are discharged from the elutriator column 1 by the flow of air under positive pressure in a fine stream to direct said remaining particles between the two electrostatic plates 8 and 9 held at a high potential difference, typically 10,000 volts. The differential in electrostatic charge of the different particles in the mixture of particles causes them to be deflected according to their electrostatic charge so that the fractions can be collected in the separate receiver bins 11 and 12 located beneath the electrostatic separator plates 8 and 9, any non-deflected particles contacting the baffle plate 13 and diverting to the recycle receiver bin 14 for return to the electrostatic separator 7 for electrostatic deflection as indicated.

Operating the method of the present invention in accordance with the foregoing practical description, gave a particle analysis of the initial material and its fractions of aleurone cell particles and pericarp-testa particles as shown in the table below:

TABLE

|  | aleurone % | pericarp testa % | yield % by wt |
|---|---|---|---|
| Starting material | 34 | 66 | — |
| Final material | 95 | 5 | 10 | in which the analysis is based on a particles count of 200+ particles.

We claim:

1. A method for the physical separation and recovery of aleurone cell particles and pericarp-testa particles present in commercial wheat bran, which comprises:
   (A) hammer-milling commercial wheat bran whereby the bran is broken and reduced into particles which consist predominantly of pericarp-testa particles and aleurone cell particles having particle sizes within the sieve mesh range of larger than about 130μm and smaller than about 290 μm, as well as particles smaller than about 40 μm; and
   (B) fractionating the aleurone cell particles from the pericarp-testa particles by:
      (i) sizing the hammer-milled bran so as to obtain a sized-fraction of particles within the sieve mesh range of larger than about 130 μm and smaller than about 290 μm,
      (ii) size-classifying said fraction of particles within the sieve mesh range of larger than about 130 μm and smaller than about 290 μm so as to remove those particles which are smaller than about 40 μm and electrostatically charge the remaining aleurone cell particles and pericarp-testa particles differentially by triboelectrification, by means of substantially dry air stream elutriation of said particles within the sieve mesh range of about 130 μm and 290 μm size sieve in an elutriator columkn so as to remove those particles which are smaller than about 40 μm and electrostatically charge the remaining aleurone cell particles and pericarp-testa particles differentially by rubbing against one another and/or against the side wall of the elutriator column, and
      (iii) electrostatically separating the size-classified remaining aleurone cell particles from pericarp-testa particles by passing an air stream entraining said electrostatically charged remaining aleurone cell particles and pericarp-testa particles through an electric field generated by an electrostatic separator, whereby said particles in the air stream are fractionated by the differential of their electric charges and deflected into separate receiver bins.

2. A method as claimed in claim 1 wherein the elutriator column comprises:

an air inlet means with an air control valve disposed at or near the base of the elutriator column and adapted for controlling a stream of filtered dry compressed air introduced into the elutriator column by compressed air pump means to entrain said size-classified product mixture of aleurone cell particles and pericarp-testa particles;

a porous diaphragm disposed near the base of the elutriator column for dispersing the stream of filtered dry compressed air delivered to the base of said column to effect entrainment of said size-classified product mixture of aleurone cell particles and pericarp-testa particles, a closable inlet chute in the elutriator column side wall and disposed above the porous diaphragm for feeding said size-classified mixture of aleurone cell particles and pericarp-testa particles into the elutriator column for air elutriation to remove those particles which are smaller than about 40 μm and electrostatically charge the remaining aleurone cell particles and pericarp-testa particles by rubbing against each other and/or the side wall of the elutriator column, an exhaust air vent with an air control valve at or near the top of the elutriator column for exit of exhaust air carrying those particles which are smaller than about 40 μm entrained therewith for the removal from the elutriator column of said particles smaller than about 40 μm, and a product mixture outlet nozzle with an air control valve disposed in the elutriator column side wall and located above the porous diaphragm for directing a stream of air with entrained electrostatically charged remaining aleurone cell particles and pericarp-testa particles from the elutriator column to between negative and positive electrode plates of the electrostatic separator for electrostatic deflection by the differential of the electrical charges of said particles;

wherein the electrostatic separator is disposed relatively adjacent the elutriator column side wall and with spaced apart negative and positive electrode plates for deflecting electrostatically charged remaining aleurone cell particles and pericarp-testa particles entrained in a stream of air directed from the elutriator column by said product mixture outlet nozzle into the space between said electrodes; and wherein the method comprises:

feeding a processing amount of the sized-fraction of aleurone cell particles and pericarp-testa particles within the sieve range of larger than about 130 μm and smaller than the 290 μm into the elutriator column via the closable inlet chute;

closing the inlet chute, closing the air control valve in said product mixture outlet nozzle, opening the air control valve in said air inlet means, opening the air control valve in said exhaust air vent, and energizing the compressed air pump means;

subjecting said processing amount of the sized-fraction of aleurone cell particles and pericarp-testa particles in said elutriation column to substantially dry air stream elutriation until those particles smaller than about 40 μm in said processing amount of aleurone cell particles and pericarp-testa particles have been removed from the elutriator column via the exhaust air vent; and energizing the electrode plates of said electrostatic separator and opening the air control valve in said product mixture outlet nozzle so that the mixture of electrostatically charged remaining aleurone cell particles and pericarp-testa particles is directed from the elutriator column by a flow of air under positive pressure in a fine stream to between said electrode plates, whereby said particles are deflected by the differential of their electrical charge into separate receiver bins located beneath the electrode plates of the electrostatic separator.

3. Air elutriator and electrostatic separator apparatus suitable for the production of a highly enriched fraction of aleurone cell particles from a size-classified product mixture predominantly of pericarp-testa particles and aleurone cell particles obtained from commercial wheat bran by hammer-milling in which the wheat bran has been broken and reduced into aleurone cell particles and pericarp-testa particles having particle sizes within the sieve mesh range of larger than about 130 μm and smaller than about 290 μm, as well as particles smaller than about 40 μm, then size-classified to be within the sieve mesh range of larger than about 130 μm and smaller than about 290 μm, said apparatus being adapted to remove those particles which are smaller than about 40 μm from said product mixture and electrostatically charge the remaining aleurone cell particles and pericarp-testa articles for electrostatic fractionation, said apparatus comprising: an elutriator clumn adapted for effecting air elutriation of said size-classified product mixture of aleurone cell particles and pericarp-testa particles in said column;

air inlet means disposed at or near the base of the elutriator column and adapted for introducing a stream of filtered dry compressed air into the elutriator column to elutriate said size-classified product mixture of aleurone cell particles and pericarp-testa particles therein;

a porous diaphragm disposed near the base of the elutriator column for dispersing the stream of filtered dry compressed air delivered to the base of said column to effect elutriation of said size-classified product mixture of aleurone cell particles and pericarp-testa particles therein;

a closable inlet chute in the elutriator column side wall and disposed above the porous diaphragm for feeding said size-classified mixture of aleurone cell particles and pericarp-testa particles into the elutriator column for air elutriation to remove those particles which are smaller than about 40 μm and electrostatically charge the remaining aleurone cell particles and pericarp-testa particles by rubbing against each other and/or the side wall of the elutriator column;

a closable exhaust air vent with associated closing means at or near the top of the elutriator column for exit of exhaust air carrying those particles which are smaller than about 40 μm entrained therewith for the removal from the elutriator column of said particles smaller than about 40 μm;

an electrostatic separator disposed relatively adjacent the elutriator column side wall and with spaced-apart negative and positive electrode plates for deflecting electrostatically charged remaining aleurone cell particles and pericarp-testa particles entrained in a stream of air directed from the elutriator column into the space between said electrodes;

a product mixture outlet nozzle disposed in the elutriator column side wall and located above the porous diaphragm for directing a fine stream of air with entrained electrostatically charged remaining aleurone cell particles and pericarp-testa particles to between the negative and positive electrode plates of the electrostatic separator for electrostatic deflection;

an aleurone cell particles fraction bin and a pericarp-testa particles fraction bin disposed beneath the negative and positive electrode plates of the electrostatic separator for receiving said deflected particles, respectively;

compressed air pump means with associated air flow control means adapted to deliver a stream of filtered dry compressed air to the elutriator column for elutration of said product mixture and to deliver a fine stream of air to the product mixture outlet means for directing entrained electrostatically charged remaining aleurone cell particles and pericarp-testa particles between the negative and positive electrode plates of the electrostatic separator for electrostatic deflection by the differential of the electrical charges of said particles; and a cyclone separator disposed in the exhaust air vent downstream of said air vent closing means for collection of those particles which are smaller than about 40 $\mu$m removed from the elutriator column by entrainment in the exhaust air.

4. Apparatus as claimed in claim 3 wherein a particles baffle plate is diposed from the downstream end of the electrostatic separator electrodes for restraining the flow of any non-deflected particles to a particle recycle bin for return of any such restrained particles to the elutriator column.

* * * * *